United States Patent [19]

Lemcke

[11] Patent Number: 4,649,646
[45] Date of Patent: Mar. 17, 1987

[54] CUTTING MECHANISM FOR POLE PRUNERS

[76] Inventor: Harland Lemcke, 14200 E. Sixth St., Corona, Calif. 91720

[21] Appl. No.: 752,832

[22] Filed: Jul. 8, 1985

[51] Int. Cl.[4] .............................................. B26B 13/00
[52] U.S. Cl. ....................................... 30/231; 30/225; 30/249
[58] Field of Search ................................ 30/249–251, 30/258, 225, 231

[56] References Cited

U.S. PATENT DOCUMENTS 149,848 4/1874 Farrington ............................ 30/249

Primary Examiner—Douglas D. Watts
Attorney, Agent, or Firm—Georges A. Maxwell

[57] ABSTRACT

An improved cutting mechanism for a pole pruner; the cutting mechanism includes a head mounted on the upper end of an elongate vertical pole. The head has an upwardly, radially forwardly and downwardly turned, recurvant, work-engaging hook defining a downwardly and laterally opening hook opening with an inner shearing edge. An elongate normally vertically extending cutting blade is normally positioned adjacent one side of the hook and is pivotally mounted at its upper end to pivot forwardly and upwardly across the hook opening. The cutting blade has an elongate actuating lever normally projecting upwardly and rearwardly from its upper end. The lever arm is pivoted rearwardly and downwardly by manually applied force to pivot the blade from its normal position across the hook opening. The cutting blade has a lancet blade with a substantially vertical forwardly disposed primary cutting edge, a substantially horizontal upwardly disposed secondary cutting edge and a forwardly and upwardly disposed tip normally projecting into the lower rear portion of said hook opening and engaging work moved up into engagement in said hook opening and preventing displacement of said work from said hook opening in advance of said cutting blade.

7 Claims, 7 Drawing Figures

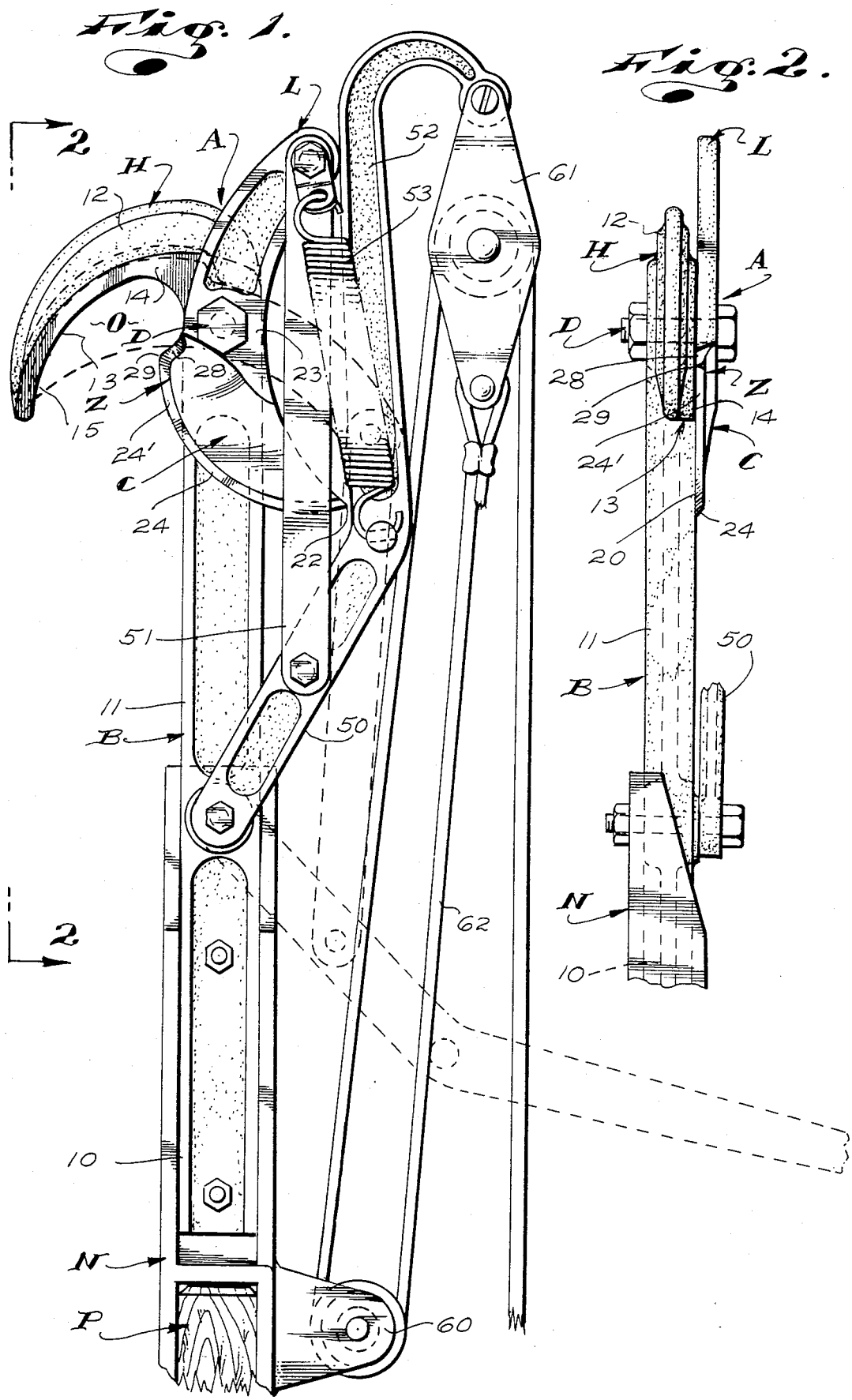

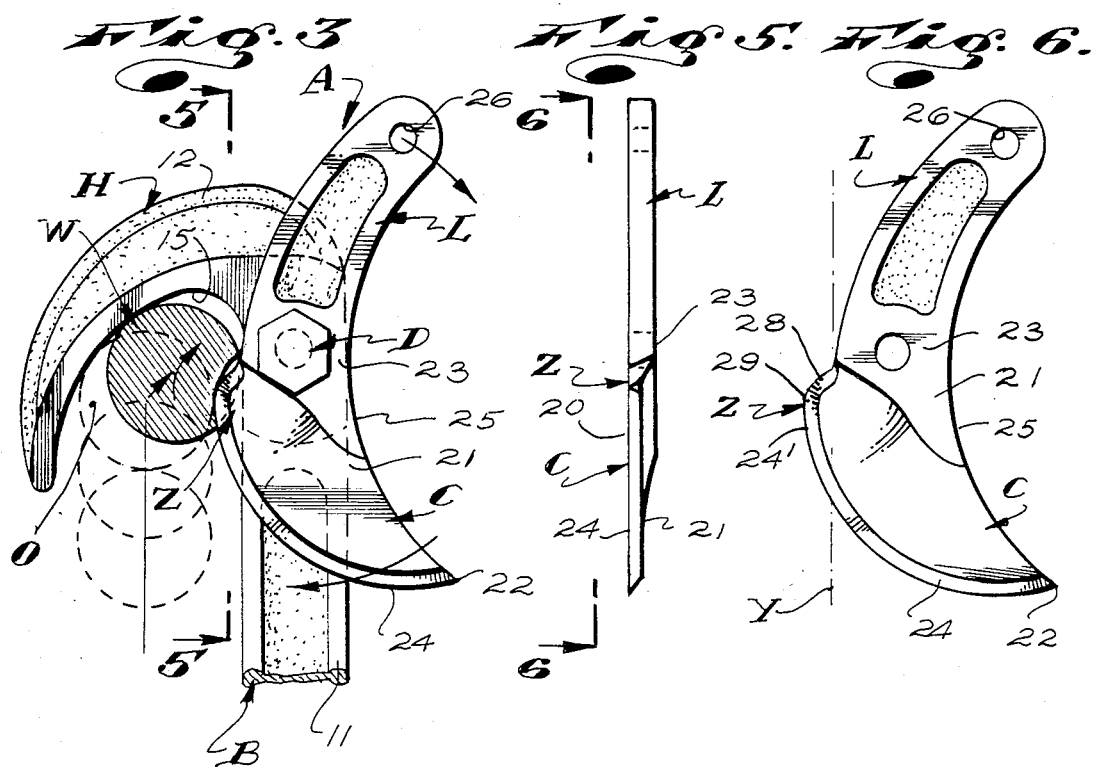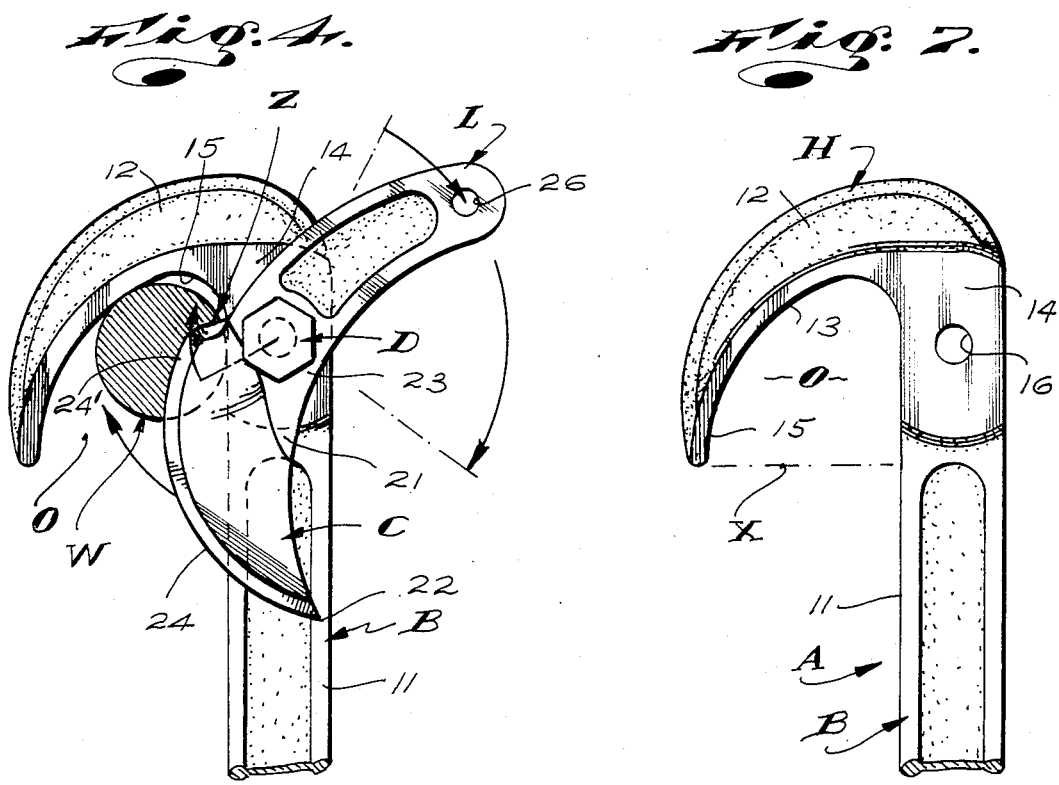

CUTTING MECHANISM FOR POLE PRUNERS

BACKGROUND OF THE INVENTION

This invention has to do with an improved cutting mechanism for pole pruners. In the art of caring for trees and plants that grow to substantial height, it is desirable that the trees and plants be pruned or trimmed to remove undesirable foliage and to control growth.

When trimming of trees and other tall plants, to reduce the number of incidents where persons must climb into trees or climb ladders and the like to effect trimming the upper reaches of the trees and plants, the prior art provides pole pruners consisting of elongate, normally vertically extending, manually engageable poles with cutting mechanisms at their upper ends.

The cutting mechanisms are normally operated by pull cords that extend to the lower ends of the poles where they can be engaged by the persons operating the pole pruners. The cutting mechanisms for pole pruners commonly include elongate, vertically extending heads with lower mounting portions connected with the upper ends of their related poles, shank portions projecting upwardly from the mounting portions and hook portions extending upwardly, radially forwardly and thence downwardly relative to the shank portions and defining downwardly and laterally opening work-receiving hook openings. The portions of the heads defining the hook openings have flat side surfaces which cooperate with inside edges of the hook openings to define inwardly disposed shearing edges. The mechanisms next include flat, elongate, normally vertically extending blades positioned adjacent the above noted flat surfaces of the heads. The upper ends of the blades are pivotally mounted on the heads adjacent the shank portions and rearward of the lower portion of the hook openings and pivot forwardly and upwardy across the hook openings and said shearing edges when actuated. The upper ends of the blades have upwardly and rearwardly projecting levers with upper rear ends connected with force applying actuating means which are manually operable at the lower ends of the poles. Rearward and downward pivoting of the levers by operation of the actuating means pivot the cutting blades forwardly and upwardly from their normal positions to their actuated positions.

Finally, most pole pruners include spring means to normally yieldingly maintain the blades in their normal positions and to yieldingly return the blades to their normal positions subsequent to their being actuated.

In use, the hooks of pole pruner cutting mechanisms are engaged over the branches of trees or plants to be cut and their blades are pivoted forwardly and upwardly across the hook openings, cutting the branches engaged therein (by operation of the actuating means). Thereafter, the blades are returned to their normal position by the spring means, preparatory to engaging the hooks with the next to be cut branches.

While pole pruners of the character referred to above have been used successively for a great number of years and while changes in the design of the cutting mechanisms therefor have been made to enhance their performance and usefulness, there is an inherent tendency for the blades of such mechanisms to displace branches downwardly and outwardly from engagement within the hook openings when and as the blades are pivoted from their normal positions into engagement with branches engaged therein, before the blades are fully actuated. The above noted displacement of branches is often called "kicking out" and becomes more common and a greater problem as the size (diameter) of branches being worked upon increases and/or as the hardness of the wood of the branches increases.

OBJECTS AND FEATURE OF THE INVENTION

It is an object of my invention to provide an improved pole pruner cutting mechanism of the general character referred to which is such that the blade does not tend to displace branches engaged in the hook opening during actuation of the cutting mechanism.

It is another object and feature of my invention to provide an improved cutting mechanism of the general character referred to wherein the cutting blade has a lancet blade portion that normally projects forwardly into the lower rear portion of the hook opening and which operates to guide and direct work into fully engaged position in said hook opening as the work is moved upwardly therein and engages and holds the work engaged in said hook opening against displacement from said opening in advance of the cutting blade when the mechanism is actuated.

The foregoing and other objects and features of my invention will be fully understood from the following detailed description of one typical preferred form and embodiment of my invention, throughout which description reference is made to the accompanying drawings.

DESCRIPTION OF THE DRAWINGS

FIG. 1 is side elevational view of a pole pruner cutting mechanism embodying my invention;

FIG. 2 is a view taken substantially as indicated by line 2—2 on FIG. 1 with parts removed;

FIG. 3 is a side elevational view showing certain parts of my invention in one position;

FIG. 4 is a view similar to FIG. 3 showing the parts in another position;

FIG. 5 is a view of the blade taken as indicated by line 5—5 on FIG. 3;

FIG. 6 is a side elevational view taken as indicated by line 6—6 on FIG. 5; and

FIG. 7 is side elevational view of the hook portion of the body of my new mechanism.

DESCRIPTION OF THE INVENTION

In the drawings I have shown a pole pruner cutting mechanism A embodying my invention. In FIG. 1 of the drawings, the mechanism A is shown connected with the upper end of an elongate vertical manually engageable handle part or pole P. The pole P can be of any desired and suitable length; can be of any suitable cross-section; and can be made of any material. In the drawings I have elected to show only the upper terminal end portion of the pole P and have indicated the pole as being established of wood.

The cutting mechanism A is shown as including an elongate unitary body forged of steel. The body B has a lower mounting portion 10, a central shank portion 11 and an upper recurvant hook portion 12.

The lower mounting portion 10 of the body B is shown an elongate vertical apertured tang-like portion engaged in and screw-fastened to a connecting means N which, in practice, is an injection molded plastic coupling part with upper and lower body and pole engaging channel portions.

The central portion or shank 11 of the body B is a straight, vertically extending portion which projects upwardly from the upper end of the lower portion 10. The shank has upper and lower ends and front, rear and opposite lateral sides.

The hook portion of the body is joined integrally with the upper end of the shank portion 11. The portion 12 continues upwardly, forwardly and thence downwardly from and relative to the front side of the shank portion 11. The hook portion 12 and the upper portion of the shank portion 11 cooperate to define a downwardly and laterally opening recurvant work engaging hook H. The hook H defines a downwardly and laterally hook opening O. The hook H occurs on a flat vertical plane that projects forwardly from the vertical axis of the shank. The hook is parabolically curved with a most acute curved upper rear portion and the opening O opens laterally at opposite sides and has a downwardly opening bottom. For purposes of this disclosure, the parabolically curved hook H and opening O will be described as being related to and formed about a central horizontal lateral axis which is normal to and spaced forward from said vertical axis of the body.

The hook H has an upwardly, forwardly and thence downwardly curved inside work-engaging and supporting edge 13, disposed substantially radially inwardly toward said central lateral axis.

One side of the hook H is embossed and milled flat on a plane parallel with said vertical plane of the structure and establishes a flat blade-supporting surface 14. The surface 14 and edge 13 converge to establish a clean, sharp inner shearing edge 15.

The upper portion of the shank 11 which cooperates with the hook portion 12 to define the hook opening O is formed with a laterally extending bearing opening 16. The opening 16 is on a horizontal plane which extends through the upper quarter portion of the hook opening O, below the top of and above the open bottom of said hook opening.

In FIGS. 1 and 7 of the drawings, I have defined the open bottom of the hook opening O with phantom lines X.

The cutting mechanism M that I provide next includes an elongate, flat normally vertically extending cutting blade C. The blade C is positioned on a plane parallel with the vertical plane. The blade has a flat laterally disposed inner bearing surface 20 on a common plane with and opposing the support surface 14 of the body, a flat or suitably hollow ground outside surface 21, a normally lower tip end 22, an upper pivot end portion 23, a normally substantially forwardly disposed forwardly and upwardly convexly curved forward slicing edge 24 with upper and lower ends and a rearwardly disposed back edge 25. The edge 24 is suitably ground and sharpened.

The upper pivot end portion 23 of the blade C has a lateral bearing opening 26 which registers with the opening 16 in the body B.

The blade C is pivotally mounted on and with the body B by a pivot pin D engaged in and through the registering openings 16 and 26. In the case illustrated, the pivot pin D is established by the shank of a suitable bolt and nut assembly, as clearly shown in FIGS. 1 through 4 of the drawings.

The blade C next includes an elongate vertical and rearwardly extending lever L. The lever L is preferably integrally joined with and extends upwardly and rearwardly from the upper pivot end portion 23 and has a coupling opening 26 in its upper free end to effect coupling the lever with a related actuating mechanism.

When the blade C is in its normal substantially vertical or unactuated position, as shown in FIGS. 1 and 3 of the drawings, it occurs adjacent its related lateral side of the shank portion 11 of the body B rearward of the front side of the shank and the lower rear portion of the hook opening O.

In furtherance of my invention and as clearly shown in the drawings, the blade C is characterized by a unique upper forward lancet blade or lancet blade portion Z that normally projects a limited distance forward from the cutting blade, per se into the lower rear portion of the hook opening O.

The lancet blade Z is preferably in the nature or form of an integral extension of the blade C and is therefore definable as a portion of the blade C. In practice, however, the lancet blade Z could be a separate blade fixed to and carried by the blade C, in which case it would be a separate part and not defined as a portion of the blade C. The lancet blade or lancet blade portion Z, whichever the case may be, performs special functions, independent of the blade C, and is to be looked at and considered separately from the blade C. In FIG. 6 of the drawing, the dotted line Y occurs along that line which divides the blades C and Z.

In accordance with the above, in the following I will refer to the lancet blade Z as a separate element or part of the construction.

The lancet blade has a normally forwardly and upwardly inclined substantially forwardly and downwardly disposed primary cutting edge 24' with upper and lower ends. The lower end of the primary cutting edge meets the upper end of the slicing edge and is shown as a continuation of the convexly curved slicing edge 24 of the blade C.

The lancet blade Z next includes a normally and upwardly and rearwardly inclined substantially upwardly disposed upper secondary cutting edge 28 with front and rear ends. The front end of the secondary cutting edge converges with the upper end of the primary cutting edge 24' to define a forwardly and upwardly disposed work piercing point or tip 29.

The tip 29 of the lancet blade Z occurs on a horizontal plane which is spaced below the horizontal plane of the pivotal axis of the blade C, that is, below the axis of the pivot pin D. The lancet blade Z normally occurs at and extends upwardly and forwardly into the lower rear one-fourth to lower rear one-half of the front side of the shank or hook opening O at and along the vertical rear edge portion of that opening defined by the shank.

When the blade C is actuated and is pivoted forwardly and upwardly about the axis of the pivot pin D, the lancet blade Z is pivotally moved forwardly and upwardly across the hook opening O and thence across the upper rear portion of the shearing edge 15 and bearing surface 14 at the top of the hook. At the same time, the blade C, which normally occurs rearward of the hook opening O, moves forwardly and upwardly into and across the hook opening O and its convexly curved s;ocomg edge 24 advances across the shearing edge and bearing surface 14 of the hook H until the blade reaches its fully actuated position where its lower tip 22 stops adjacent the lower forward end or tip of the hook H, as shown in dotted lines in FIG. 1 of the drawings.

In operation and use of my new mechanism A and as shown in FIGS. 3 and 4 of the drawings, the lancet blade Z normally serves as a restriction limited in the lower rear portion of the hook opening O by and over which a piece of work W, such as a tree limb, must be urged and forcibly advanced when moved upwardly into fully stopped and seated engagement in the hook H.

When the work W first engages and is moved upwardly relative to the lancet blade Z, the forwardly and upwardly inclined substantially forwardly disposed convex cutting edge 24' slices or cuts into the work and at the same time, urges and holds the work forwardly within the hook opening. When the upper portion of the work W advances upwardly in the opening O and hook H above the lancet blade Z, it is guided by the hook so that it pivots and turns or shifts rearwardly about the tip 29 of the lancet blade, as clearly shown in FIG. 3 of the drawings.

When the work W is caused to turn or shift rearwardly relative to and about the tip 29, the initial cut made in the work by the primary cutting edge 24' tends to turn rearwardly and downwardly or to shifted rearwardly toward the secondary cutting edge 28 and the forwardly and upwardly disposed tip 29 is directed to and bites into or pierces material in the work not previously worked upon to retain the work up in the hook opening.

In the case of items of work that are smaller in cross-section than is shown in the drawings, when the work is moved fully upward and rearward in the hook opening above the lancet blade Z it is initially pierced and held up in the opening O and against displacement from the opening O by the blade Z in advance of the slicing edge of the cutting blade C.

In the case of items of work that are substantially larger in cross-section than is shown in the drawings, the lancet blade cuts into the work when the work is moved up into the hook opening and its tip 29 pierces and bites into and retains the work up in the hook opening immediately upon commencing actuation of the mechanism and in advance of the cutting blade C.

In accordance with the above, while the precise action of the lancet blade Z to cut and bite into related work might vary slightly when smaller than normal and when larger than normal branches are engaged and cut, it is effective, in all instances, to retain the work in the hook opening and to prevent the blade C from urging or "kicking out" the work from engagement in the hook opening when the blade C is moved forwardly and upwardly into and through the work.

As clearly shown in FIG. 4 of the drawings, when actuating the blade C from its normal position to its actuated position and before the portion of the slicing edge 24 thereof moves into cutting engagement with the work W, the secondary cutting edge 28 and tip 29 of the lancet blade Z move upwardly and rearwardly in the work W to not only prevent downward displacement of the work but also to move the work upwardly and rearwardly in the work opening O and into full seated or stopped engagement in the hook H. The upper portion of the slicing edge 24 of the blade C (below the primary cutting edge 24' of the lancet blade Z), when advanced into engagement with the work W, is normally and in most instances advanced forwardly to a degree or extent that it is disposed forwardly and upwardly and works to hold and move the work W up into the hook opening before the lancet blade Z is advanced completely through the work and reaches a fully actuated position. Accordingly, any large piece of work that can be moved upward into hook opening O and into engagement in the hook H is effectively retained in the opening O and hook H by the lancet blade Z upon commencing actuation of the mechanism A and until the blade C is advanced to a position where it serves to hold the work up and in the said opening and hook.

In the case illustrated, the tip 29 of the lancet blade is convexly curved or somewhat rounded and the secondary cutting edge 28 is concaved and normally disposed upwardly and forwardly. This configuration of the tip 29 and secondary cutting edge 28 has been adopted since it is that shape which best lends itself to grinding and sharpening the tip and that edge when mass producing the invention, using long established and proven blade finishing techniques and procedures. For all intents an purposes, the tip 29 can be pointed and the secondary cutting edge 28 can be straight.

While I have shown my new blade structure in a single pass type shear structure, it will be apparent that it will function in the same manner and attain the same end results if used in a pass through type shear structure, that is, in that class of shear structure where the blade is moved between and accepted by laterally spaced work supporting shear structure elements or parts.

While I have elected to show my new blade structure related to a shear type cutting mechanism for a pole pruner, it will be apparent that it can be advantageously embodied in other types of agricultural shears which are characterized by pivotally related work supporting hook parts or portions with concave-surved shearing edges and blades with convexly curved or slicing edges.

Referring once again to FIG. 1 of the drawings, the pruner structure illustrated includes a parallelogram type link and lever actuating mechanism with return spring means and a related block and tackle type drive means.

The above noted actuating mechanism is shown as including an elongate normally upwardly and rearwardly inclined lever arm 50 with its lower front end pivotally connected with the shank 11 of the body B, a drive link 51 extending vertically between and pivotally connected with the upper end of the lever L of the blade C and the central portion of the lever arm 50 to normally extend parallel with the shank 11, rearward thereof. The lever arm 50 has an upwardly extending and thence rearwardly turned extension 52 with an upper rear end. An elongate axially extensible return spring 53 is connected with and between the upper end of the link 51 and the lever 50 (rearward of the lower end of the link) to normally yieldingly urge and hold the rear end of the link up and the mechanism in its unactuated position.

The block and tackle drive means for the actuating mechanism includes a lower single sheave block 60 carried by or formed on the mounting part N, an upper single sheave block 61 coupled to the upper end of the lever arm extension 52 and an elongate operating line or cord 62 with an end connected with the upper block 61, extending therefrom and about the sheave of the lower block 60, extending from the lower block 60 about the sheave of the upper block 61 and thence down the pole P where it is manually engageable by the operator of the pole pruner.

In practice, the lever 50 and blade C occurs on a common plane and pairs of like laterally spaced links 51 and springs 53, at opposite sides of the lever and blade, are provided to suitably balance and prevent binding of the mechanism. Accordingly, the link and spring shown in FIG. 1 are identical with a link and spring at the other opposite side of the structure shown.

The rule of action and mode of operation of the actuating and drive means shown in the drawings and briefly described above is evident from a cursory examination of FIG. 1 of the drawings.

The actuating and drive means illustrated in the drawings and briefly described in the foregoing are those means embodied in the pole pruner in which my invention has been embodied and are illustrated and described for the purpose of showing a complete and operable embodiment of my invention.

In practice, the actuating and drive means noted above may vary widely and might be replaced by a single pull cord connected with the upper end of the lever L of the blade C, without departing from or affecting my invention, which resides in the above described and illustrated lancet blade Z and the relationship of that blade with the cutting blade C, hook H and with work related thereto.

Having described only one typical preferred form and embodiment of my invention, I do not wish to be limited to the specific details herein set forth but wish to reserve to myself any modifications and/or variations that might appear to those skilled in the art and which fall within the scope of the following claims.

Having described my invention, I claim:

1. A shear-type cutting mechanism including a body with an elongate vertically extending shank with upper and lower ends and front, rear and lateral sides, a manually engageable handle, a hook extending upwardly, forwardly and thence downwardly from the upper end of the shank on a vertical plane and cooperating with the shank to define a laterally opening hook opening with an open bottom and extending about a horizontal lateral axis spaced forward from the shank and normal to said vertical plane, said hook has an upwardly, forwardly and thence downwardly curved shearing edge disposed into said hook opening, a laterally extending first bearing opening through the upper portion of the shank on an axis spaced rearward of and above the open bottom of said hook opening, an elongate normally vertically extending flat cutting blade with upper and lower ends positioned adjacent one laterally disposed side of the shank rearward of the front side of the shank and hook opening on a plane parallel with said vertical plane, said blade has a lower tip end, a rear edge, a normally forwardly and upwardly convexly curved slicing edge with upper and lower ends extending upwardly from said tip end and terminating adjacent the front side of the shank and an upper pivot end with a second bearing opening registering with the first bearing opening, a pivot pin engaged in and through said registering bearing openings and pivotally mounting the blade on the body, an elongate lever at and extending up from the upper pivot end of the blade, actuating means coupled with the lever to pivot the lever rearwardly and downwardly and pivot the cutting blade forwardly and upwardly across the hook opening to an actuated position where said slicing edge is moved across said shearing edge, said cutting blade carries a lancet blade between the upper end of the slicing edge and said pivot end, said lancet blade normally projects forwardly into the lower rear portion of the hook opening, said lancet blade has an elongate normally forwardly and upwardly inclined primary cutting edge with upper and lower ends, a normally upwardly and rearwardly inclined secondary cutting edge with front and rear ends and a normally forwardly and upwardly disposed work-piercing tip at the junction of said primary and secondary cutting edges, said primary cutting edge cuts into adjacent sides of work moved upwardly into engagement in the hook opening and guides said work upwardly into engagement with the shearing edge, said shearing edge guides said work rearwardly in the hook opening about and into pierced retained engagement with said tip and above said secondary cutting edge preparatory to pivoting the cutting blade to its actuated position.

2. The shear-type cutting mechanism set forth in claim 1 wherein the lower end of the primary cutting edge meets the upper edge of the slicing edge.

3. The shear-type cutting mechanism set forth in claim 1 wherein the lancet blade is formed integrally with the cutting blade.

4. The shear-type cutting mechanism set forth in claim 1 wherein the lancet blade is formed integrally with the cutting blade and wherein the lower end of the primary cutting edge meets the upper edge of the slicing edge.

5. The shear-type cutting mechanism set forth in claim 1 wherein the secondary cutting edge is of limited length and is positioned relative to the pivot pin so that said point and secondary cutting edge pivot forwardly upwardly and rearwardly across the upper rear portion of the hook opening rearward of said lateral axis when the cutting blade is pivoted from its normal position to its actuated position.

6. The shear-type cutting mechanism set forth in claim 1 wherein the secondary cutting edge is of limited length and is positioned relative to the pivot pin so that said point and secondary cutting edge pivot forwardly upwardly and rearwardly across the upper rear portion of the hook opening rearward of said lateral axis when the cutting blade is pivoted from its normal position to its actuated position, the lower end of the primary cutting edge meets the upper end of the slicing edge.

7. The shear-type cutting mechanism set forth in claim 1 wherein the secondary cutting edge is of limited length and is positioned relative to the pivot pin to pivot forwardly upwardly and rearwardly across the upper rear portion of the hook opening rearward of said lateral axis when the cutting blade is pivoted from its normal position to its actuated position, the primary cutting edge and the slicing edge are disposed and positioned relative to the secondary cutting edge and to the pivot pin to pivot forwardly across the open bottom of the hook opening before said secondary cutting edge pivots upwardly and rearwardly across the shearing edge as the cutting blade is pivoted toward its actuated position.

* * * * *